United States Patent [19]

Ito et al.

[11] Patent Number: 4,762,418
[45] Date of Patent: Aug. 9, 1988

[54] ANGLE-OF-OPTICAL-ROTATION VARIATION MEASURING APPARATUS

[75] Inventors: Toshiaki Ito; Mitsuo Hiramatsu; Isuke Hirano, all of Shizuoka, Japan

[73] Assignee: Hamamatsu Photonics Kabushiki Kaisha, Shizuoka, Japan

[21] Appl. No.: 70,253

[22] Filed: Jul. 6, 1987

[30] Foreign Application Priority Data

Jul. 8, 1986 [JP] Japan .................................. 61-160477

[51] Int. Cl.$^4$ ............................................. G01N 21/21
[52] U.S. Cl. ..................................... 356/364; 250/225; 356/368
[58] Field of Search ............... 356/364, 366, 367, 368; 250/225

[56] References Cited

U.S. PATENT DOCUMENTS 3,693,082 9/1972 Jaecklin ........................... 356/368 X
4,508,832 4/1985 Carter et al. ..................... 356/364 X
4,637,726 1/1987 Walker et al. ....................... 356/367

Primary Examiner—Davis L. Willis
Assistant Examiner—Matthew W. Koren
Attorney, Agent, or Firm—Finnegan, Henderson, Farabow, Garrett & Dunner

[57] ABSTRACT

An angle-of-optical-rotation variation measuring apparatus for measuring the highly speedy time-variation of an angle of optical rotation of an optical active substance. The angle-of-optical-rotation variation measuring apparatus comprises an exciting pulse generating source for producing and providing an exciting pulse to a specimen, a light source for providing a monochromatic linearly polarized light beam with the specimen, continuous analysis means for optically rotating the light beam passed through the specimen at successively different angles in the direction of a reference line predetermined to the apparatus and transmitting as an output light beam a part of the light beam which is optically rotated at a predetermined angle, and a streak tube for receiving the output light beam from the analysis means in a direction perpendicular to a time axis of the streak tube.

6 Claims, 2 Drawing Sheets

ANGLE-OF-OPTICAL-ROTATION VARIATION MEASURING APPARATUS

BACKGROUND OF THE INVENTION

1. Field of the Invention

This invention relates to an apparatus for measuring the variation with time of an angle of optical rotation of a substance such as an optically active liquid crystal having a photochromic functional group, whose angle of optical rotation is changed by an external signal such as optical excitation from outside (hereinafter referred to as "an angle-of-optical-rotation variation measuring apparatus", when applicable).

2. Prior Art

There has been known an optically active liquid crystal in the art, wherein upon application of light the photochromic functional group is optically activated; that is, the photochromic functional group is changed in structure, with the result that the optical active substance of the liquid crystal having the photochromic functional groups between the molecules is changed in the angle of optical rotation.

A light-light modulator can be formed by utilizing such a substance.

The change in the angle of optical rotation of the optically active substance occurs in the sequent steps of application of an exciting light beam, optical isomerization of the photochromic compound, high order structural change of the liquid crystal molecules and change in the angle of optical rotation.

In general, the liquid crystal shows a singular optical activity with a time delay from application of the exciting light beam.

FIG. 3 is a time chart showing the optical activity caused by an external stimulus (such as application of the exciting light beam).

As is apparent from FIG. 3, the optical active substance shows the optical activity with a delay time from the application of the external stimulus (or exciting light beam). Even after the application of the exciting light beam has been suspended, the angle of optical rotation is increased and then maintained at a certain value for a while. Then, the angle of optical rotation is gradually decreased and consequently restored to the original state.

An apparatus for measuring the behavior of rotation of polarizing plane of the specimen which is used for forming the light-light modulator is constructed as shown in FIG. 4.

In the apparatus, a polarizer 41, a specimen 40 and an analyzer 42 are arranged in this order.

A light beam linearly polarized by the polarizer 41 is applied to the specimen 40. Of the light polarizing planes of which are rotated, those which coincide in angle of optical rotation with the analyzer 42 are passed through the analyzer 42, concentrated by a lens 43, and subjected to photo-electric conversion by a detector 44.

As shown in FIG. 5, when the angle of optical rotation of the specimen reaches a value $\theta$ (an angle of the analyzer at which light is mainly passed through the analyzer), the output of the detector is maximum.

More specifically, the maximum output is obtained twice while the angle of optical rotation is increased to the value $\theta$ and decreased to the value $\theta$, as is apparent from FIG. 5.

The light beam (or probe light beam) applied to the specimen 40 through the polarizer 41 is constant in intensity.

When the angle ($\theta$) of the analyzer 42 is set to an optional value, the time required for the angle of optical rotation of the light passed through the analyzer to reach the angle thus set can be determined from the period of time between the time instant when the external signal is inputted and the time instant when the output of the detector 44 becomes maximum. Accordingly, an optical rotatory characteristic curve can be formed according to a method in which, in the above-described apparatus, the angle $\theta$ of the anlayzer is set to various values, and periods of time for the output of the detector to reach the values thus set are measured.

In the above-described apparatus, the optical pulse is used for the excitation; however, it is well known in the art that instead of the optical pulse, an electric field, magnetic field or pressure may be used.

The optical rotatory characteristic curve of a specimen under examination can be obtained by using the data which are provided by operating the apparatus as described above; however, the time resolution thereof is limited by the characteristic of the detector employed. For instance, in the case where the optical detector is made up of a photomultiplier, it is impossible to perform the measurement at a speed higher than the response speed of the photomultiplier.

Furthermore, as was described above, one measurement detects a phenomenon fragmentarily with respect to time. Therefore, when the response of a specimen under test is not accurately in correspondence with an excitation thereof (i.e., when the specimen has hysteresis), reproduction of the correct profile thereof cannot be obtained.

SUMMARY OF THE INVENTION

Accordingly, an object of the present invention is to eliminate the above-described difficulties accompanying a conventional angle-of-optical-rotation variation measuring device. More specifically an object of the invention is to provide an angle-of-optical-rotation variation measuring apparatus in which one measurement can provide the segment profile of a high speed angle-of-optical-rotation variation of a specimen under test.

The foregoing object of the invention has been achieved by an angle-of-optical-rotation variation measuring apparatus according to the invention, comprising: an exciting pulse generating source for producing an exciting pulse used for excitation of a specimen; a monochromatic linearly polarized light source for providing a probe light beam for irradiating the specimen; continuous analysis means for transmitting a light beam passed through the specimen which is optically rotated at successively different angles of optical rotation in the direction of a reference line of the apparatus; and a streak tube for receiving the output, in the direction of the reference line, of the analysis means in a direction perpendicular to the time axis of the streak tube and monitoring the output in synchronization with the exciting pulse.

In addition to the above construction of the angle-of-optical-rotation variation measuring apparatus according to this invention, the monochromatic linearly polarized light source may comprise: a monochromatic light source; a polarizer; and a slit board having a slit which is extended in the polarizing direction of the polarizer. Further, the continuous analysis means may comprise:

an optical activity compensating cell formed of optical active substance which is continuously variable in thickness in the direction of the reference line to optically rotate the probe light beam at successively different angle in the direction of the reference line; a time delay compensating cell for compensating different propagation delays provided by the optical activity compensating cell; and an analyzer for analyzing a light beam passed through the compensating cell.

DETAILED DESCRIPTION OF THE INVENTION

This invention will be described hereinafter with reference to the accompanying drawings in more detail, wherein a light source is employed for an exciting pulse source.

Figure 1:
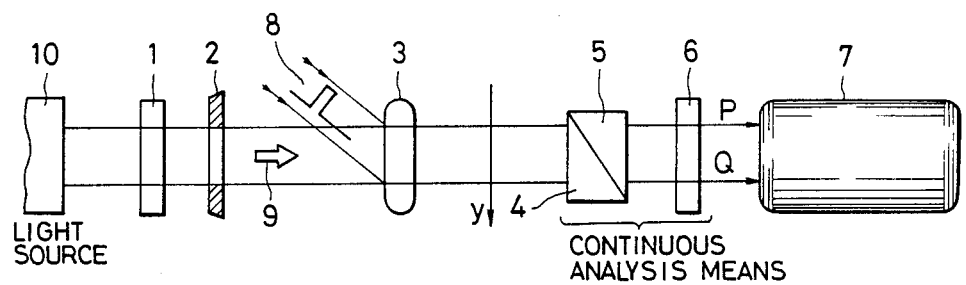
FIG. 1 is an explanatory diagram showing the arrangement of one embodiment of an angle-of-optical-rotation variation measuring apparatus according to the invention.

FIG. 1 is a diagram showing the arrangement of an angle-of-optical-rotation variation measuring apparatus according to the invention.

A monochromatic light beam from a light source 10 is covered into a linearly polarized light beam by a polarizer 1.

The direction of a slit formed in a slit board 2 is in alignment to a reference direction as indicated by the arrow (y) in FIG. 1. A light beam applied to a specimen 3 through the slit board 2 will be referred to as "a probe light beam" hereinafter.

Figure 2A:
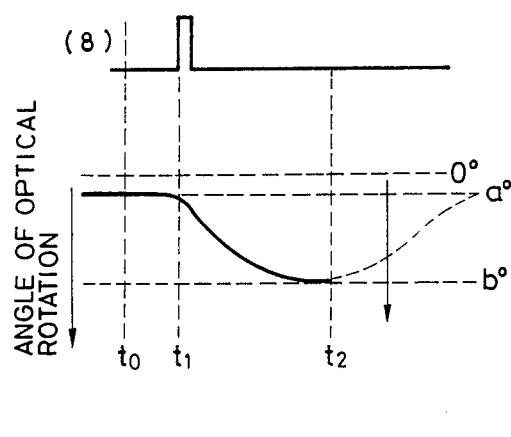
FIG. 2A and FIG. 2B are diagrams for a description of the operation of the apparatus in FIG. 1.

The specimen 3, being excited by an exciting optical pulse from a light source (not shown), shows an optical activity as indicated in FIG. 2A.

The light beam passed through the specimen 3 is applied to a continuous analysis means adapted to transmit a light beam which is optically rotated at successively different angles in the direction of the reference line (y).

The continuous analysis means comprises an optical activity compensating cell 4 made of optical active substance which is continuously changed in thickness along the reference direction to optically rotate the probe light beam passed through the specimen 3 at different angles along the reference direction, a time delay compensating cell 5 for compensating different propagation delays provided by the optical activity compensating cell 4; and an analyzer 6 for analyzing the light beam passed through the compensating cell 5.

The optical activity compensating cell 4 comprises a wedge-shaped transparent container filled with an optically active medium (obtained for instance by diluting limonene with ethanol). The compensating cell 4 provides different angles of optical rotation along the reference direction.

The time delay compensating cell 5 is used to correct the time lag in the y-axis direction which is caused by the optical activity compensating cell, and to maintain the emergent angle parallel. If the compensating cell 5 is made of the material which is equal in refractive index to the optical active medium, then it may have the same configuration as the optical activity compensating cell 4.

That is, with the continuous analysis means comprising the elements 4, 5 and 6, the angle of optical rotation is changed continuously along the y-axis direction (from P to Q) in such a manner that, in FIG. 1, a light beam having an angle of optical rotation of a° is most intensively observed at the position P and a light beam having an angle of rotation of b° is most intensively observed at the position Q.

In a streak tube 7, the light beam passed through the continuous analysis means is received on a photocathode of the streak tube 7 while the positions from P to Q are detected along the slit of the streak tube 7 (i.e., perpendicular to the direction of deflection), and monitored in synchronization with the exciting pulse, so that a streak image is obtained in synchronization with the exciting pulse.

Figure 2B:
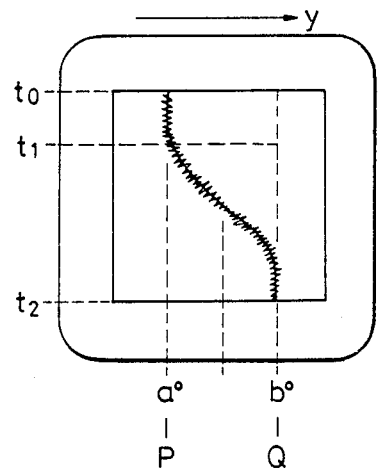
Figure 3:
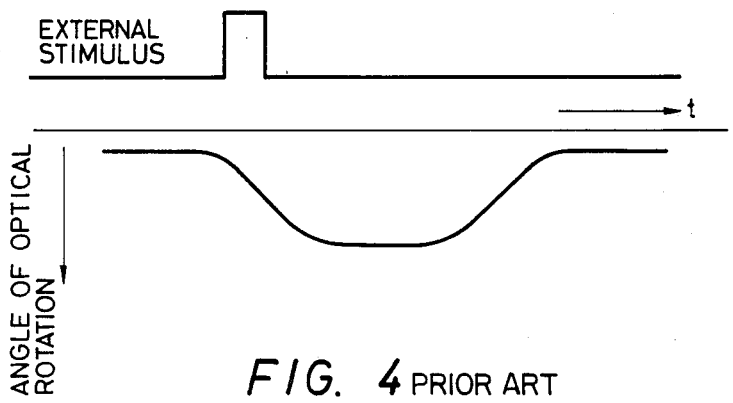
FIG. 3 is a time chart indicating external stimulus (light application) with optical activity.
Figure 4:
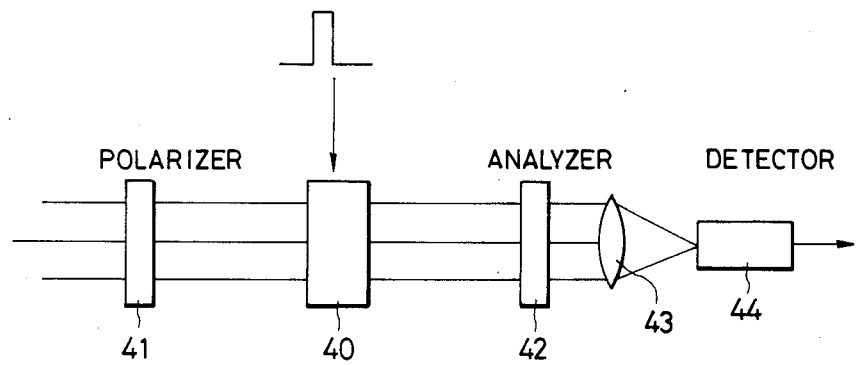
FIG. 4 is an explanatory diagram showing the arrangement of a conventional angle-of-optical-rotation variation measuring apparatus.
Figure 5:
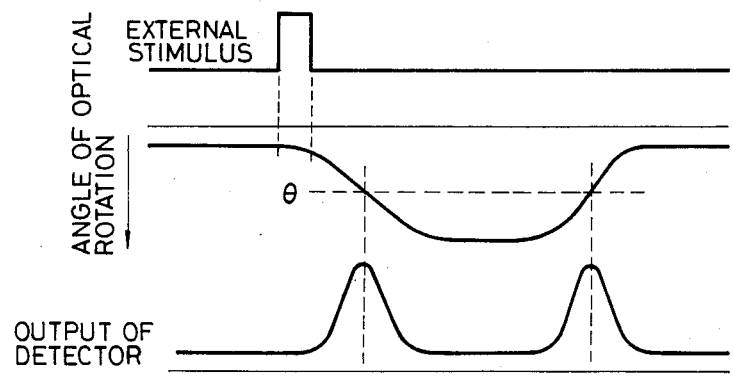
FIG. 5 is a time chart for a description of the operation of the conventional apparatus.

FIG. 2A shows the exciting pulse and the variation of the angle of optical rotation, and FIG. 2B shows an streak image on the output surface of the streak tube with the variation of the angle of optical rotation.

As is apparent from FIG. 2B, information on the variation of the angle of optical rotation can be obtained along the axis of the slit of the streak camera.

Thus, angle-of-optical-rotation information together with time information can be sequently obtained on the monitor of the streak camera from one event.

As was described in detail, the angle-of-optical-rotation variation measuring apparatus according to the invention is suitable for extremely high speed measurement, and can detect a "speed of rotation of a polarizing plane" for an ultra-high speed response light-light modulator.

Owing to the novel technique of the invention that the angle-of-optical-rotation information are obtained along the axis of the slit of the streak camera, the nonlinearity of the polarizing rotation can be observed with only one event.

This element behavior observation provides an information source which is considerably important for analysis of the dynamics of molecular motion by optical isomerization.

What is claimed is;

1. An angle-of-optical rotation variation measuring apparatus comprising:
    an exciting pulse generating source for producing and providing an exciting pulse to a specimen;
    a light source for providing a monochromatic linearly polarized light beam with said specimen;
    continuous analysis means for optically rotating said light beam passed through said specimen at successively different angles in the direction of a reference line predetermined to said apparatus and transmitting as an output light beam a part of said light beam which is optically rotated at a predetermined angle; and
    a streak tube for receiving said output light beam from said analysis means in a direction perpendicular to a time axis of said streak tube.

2. An apparatus as claimed in claim 1, wherein said exciting pulse generating source is an optical pulse source.

3. An apparatus as claimed in claim 1, wherein said light source comprises a monochromatic light source for producing a monochromatic light, a polarizer for linearly polarizing said monochromatic light and a slit board having a slit elongating in the direction of polarization of said polarizer.

4. An apparatus as claimed in claim 1, wherein said continuous analysis means comprises an optical activity compensating cell including optical active substance for optically rotating said light beam at successively different angles in the direction of said reference line, a time delay compensating cell for compensating different propagating delays provided by said optical activity compensating cell, and an analyzer for analyzing a light beam passed through said compensating cell.

5. An apparatus as claimed in claim 4, wherein said optical activity compensating cell has continuously variable thickness in the direction of said reference line.

6. An apparatus as claimed in claim 2, wherein said output light beam is monitored by said streak tube in synchronization with said exciting pulse.

* * * * *